Patented May 12, 1942

2,282,779

UNITED STATES PATENT OFFICE 2,282,779

METHOD OF PRODUCING GLYCERIDE OIL

Sidney Musher, New York, N. Y., assignor to Musher Foundation Incorporated, New York, N. Y., a corporation of New York No Drawing. Application March 18, 1942, Serial No. 435,245

11 Claims. (Cl. 260—412.2)

This invention relates to the preparation of novel stabilized olive oil compositions having unusual taste, aroma and fragrance.

In accordance with the present invention, it has been found that where ripened olives are especially dehydrated by being salted or brined and then expressed, the resultant oil is different in character, flavor and other properties than olive oil of commerce and has the unusual property when added in small proportions to other glyceride oils of developing an unusually powerful and desirable high grade olive oil fragrance and taste.

This oil may be utilized as such or in combination with other oils much more readily than olive oil normally manufactured from the unsalted, undehydrated olives.

In preparing the olives for treatment, they are picked desirably when fully ripe and before any fermentation has set in. The olives will vary in color from red to purple and they are preferably more purple than red when used in accordance with the present invention.

The olives are then packed with from 25% to 100%, and preferably about 50%, of their total weight of dry common salt by alternating layers of salt and olives. These olives packed with salt are desirably placed in wooden bins so that as the brine is formed, it will flow away from the olives.

At regular intervals of from 1 to 3 days, the olives are transferred, such as by shoveling, from one part of the bin to another part and in that way the olives are constantly kept in contact with the dry salt and there appears to be some heat which develops in the olives during the salting operation which aids in the penetration of the salt and in the development of the desired characteristics in accordance with the present invention.

This salting treatment is continued until the total moisture content of the olives is reduced to 30% or less and desirably under 25%. During this salting treatment, the olives turn black and they are utilized in black condition. The salting will require from about 20 to 45 days dependent upon whether the olive trees were previously exposed to excess rains as the higher the moisture content of the olives at the time they are packed with salt, the longer the period that is required to effect the desired dehydration.

The flesh of the dehydrated, shriveled black olives will contain not less than about 5% of salt and desirably between 7% and 10% or more of salt.

It is of the greatest importance that the olives be fully and completely salted for, where incomplete salt concentration is used, as for example by using dilute salt brines instead of packing in dry salt, the olives undergo a type of lactic acid fermentation which produces a type of olive that cannot be used in accordance with the procedures of the present invention.

After the salting has been completed, the black shriveled dehydrated olives are removed from the bin and may, where desired, be washed either with brine or with oil to remove the excess salt adherring to the olives.

The shriveled black dehydrated salted olives will have lost between 20% and 45% of their total original weight. Moreover, as a result of the salting, the olive flesh will have taken up salt so that it has a substantial salt content.

These salted dehydrated black olives may where desired be ground into paste form or finely macerated. The olives may be ground by putting through an attrition mill or by subjecting to a stone or iron rolling or colloid mill treatment. For example, the olives may be allowed to pass between stone or iron rollers in order finely to mill and divide the olives into paste form.

The salted dehydrated black olives are then expressed by subjecting to hydraulic or expeller expression in order to remove the oil contained therein.

The oil obtained from these black shriveled salted dehydrated olives does not appear to have any more pronounced flavor than any other oil from olives which have not been specially salted or dehydrated in the aforesaid manner but it has the power when added in small percentages to other glyceride oils of developing an unusually powerful and desirable high grade olive oil fragrance and taste.

However, when the oil expressed from these salted black shriveled dehydrated olives is mixed with a flavorless oil such as with refined deodorized vegetable oils, including cottonseed oil, corn oil, peanut oil, sesame oil, soya bean oil, sunflower seed oil, etc., or even with refined olive oil, there is developed a concentrated olive flavor.

This powerful flavor is developed even where as little as 2% to 10% of the olive oil prepared from the black shriveled dehydrated salted olives is used with the refined deodorized flavorless oil.

The oil thus obtained as expressed from the salted olives, preferably in ripened condition, has a superior stability and is substantially stabilized against oxidative deterioration. Moreover, the intensity of its flavor and aroma is of the greatest importance and by a visual examination of the oil produced from the salted olives in comparison with ordinary olive oil, it could not be imagined that such oil would develop such a pronounced aroma and flavor characteristic when used in a minor proportion for blending with other glyceride oils referred to above Apparently some catalytic or chemical action occurs both in the salting and dehydration, as well as in the body of the refined glyceride oil to which the oil is added which results in the development of the novel taste and flavor characteristics when the olive is fully salted and dehydrated in accordance with the present invention.

When such black dehydrated olives are expressed, preferably by first reducing to paste form, the oil may then be admixed with or blended with other oils, preferably refined and deodorized, with unusual development of highly desirable aromatic, antioxygenic and other characteristics.

The results of the present invention are particularly unusual since salt has been recognized as having pro-oxidant properties but where the black shriveled dehydrated olives of the present invention before pressing contain as much as 7% to 10% of salt, the glyceride oils pressed from those olives possess highly desirable and unusual stabilizing characteristics.

In addition to salting the olives by placing them in bins using alternating layers of olives and salt, the olives may less preferably also be immersed in a fully concentrated or saturated brine containing 20% to 25% or more of salt, which brine will shrivel the olives without permitting any fermentation to take place.

The olives are held in that brine until the salt has thoroughly and completely penetrated through the entire flesh of the olive and the olive is thoroughly shriveled and dehydrated.

The saturated concentrated salt brine in which the olives are immersed should contain not less than about 20% by weight of salt and desirably the salt should be held at its maximum concentration. At regular intervals of from 1 to 2 days the brine in which the olives are held should be tested and additional salt added in order to maintain the salt at its proper concentration before the salting and dehydration is permitted to continue.

Where the olives are immersed in the concentrated or saturated brine, they should be held in that brine for a period of not less than about 20 days and frequently as much as 30 to 45 days and until the salt has thoroughly penetrated into the flesh of the olives and the dehydration and shriveling have been completed.

The black shriveled dehydrated olives may then be removed from the brine and are ready for expression in the aforesaid manner.

Where the salt content is not sufficiently high such as where the salt content is held at about 5% in the brine, a gaseous fermentation takes place and there is very little or no dehydration. No matter how long these olives are held in the dilute brine, the olives are not satisfactory for use in accordance with the present invention, as in the present invention it is necessary for the salting and dehydration to be completed using the fully concentrated brine or a high proportion of the dry salt over and beyond any preserving effect in order to obtain the oil desired for use in accordance with the present invention.

There may also be utilized green olives either together with or in lieu of the ripe olives. Where green olives are employed, they are desirably placed in the concentrated brine as they cure out more completely and more readily by being held in concentrated or saturated brine of 20% to 25% salt concentration than by being placed in wooden bins with alternating layers of olives and dry salt. These green olives when placed in dry salt tend to darken whereas when held in the concentrated brine they retain their green color, but in any event the unusual desirable properties of the olive oil are obtained by treating the olives in such manner as to obtain penetration of the salt, either by dry salting or by immersion in a substantially concentrated salt brine, through the tissues of the olives.

The olives may also be subjected to a pitting operation whereby their pits are removed and only the flesh portions are utilized. The olives may, for example, be pitted before they are salted or the olives may be subjected to a blanching or rubbing which will remove the flesh from the pits and only the flesh portion may then be subjected to the expression procedure.

Although it is preferred to treat the ripened olives with a relatively large quantity of solid salt or less preferably concentrated salt brine of 20% to 25% salt concentration to shrivel, dehydrate, and cause the development of the unusual characteristics in the oil extracted from the olives, it has also been found that less desirably the ripe olives may be thoroughly macerated or ground to form a fine paste and this paste then may be mixed with relatively large quantities of solid salt or less preferably with a concentrated saturated salt brine.

The amount of solid salt added to the macerated black ripe olive paste or the ground black ripe olive paste may vary from 20% to 35%, whereas the saturated or concentrated salt brine may vary from 30% to 60%. Where a concentrated saturated salt brine is mixed with the ground ripe olive paste, it is desirable to keep adding the salt from time to time so that the salt solution which is present will always be maintained at its full concentration and desirably the solid salt or the salt brine is constantly agitated, mixed or stirred in with the paste, or this stirring is carried out at regular intervals throughout the period of treatment and until the desired change has taken place in the macerated olive paste.

After the treatment has continued and the desired change has taken place, such as after 15 to 30 days or more, the aqueous layer containing the salt brine may then be removed by decantation or centrifuging and the oily paste upon separation from the brine may then be pressed as in an hydraulic press to remove the oil therefrom. This oil will be of a type when added in small quantities of up to 5% to develop these highly unusual and unpredicted flavors, taste, odor and stability characteristics in refined glyceride oils.

Although it is above mentioned that a paste of ripe olives is preferably utilized for addition with the solid salt or concentrated saturated salt brine or 20% to 25% salt concentration, it also is possible to utilize a paste of green olives in unripe condition, in which case higher quantities of salt are necessary. In such a case, from 50% to 200% more salt is utilized with the green olive paste than would be utilized with the ripe olive paste.

With regard to any of these procedures, after the salted black shriveled dehydrated olives or the olive paste have been expressed, there will be removed both the oil of the olives and also the salt brine, which brine includes the salt which has penetrated into the flesh of the olive and the small amount of moisture still left in the olive flesh.

This combination of oil and brine which is expressed from the olives or from the olive paste is then centrifuged, decanted and/or filtered or otherwise clarified in order completely to separate the salt brine and moisture from the oil and this oil is used in accordance with the procedures of the present invention.

It has been found particularly desirable for the olives after salting or brining to be ground to a paste and this oil expressed from the paste of the salted or brined olives is superior in flavor, stability and quality to the oil which is obtained directly from the expression of olives which have not been ground to the paste condition but which have otherwise been similarly treated.

The residue that is obtained following the expression of the oil from these dehydrated salted olives may desirably be utilized for infusion purposes by mixing it with a glyceride oil preferably in refined deodorized condition such as, for example, refined deodorized corn oil, cottonseed oil, peanut oil, sesame oil or soya beam oil. The residue should preferably be put into finely divided condition either by grinding in a colloid mill or in an attrition grinder before mixture with the oil which is to receive the infusion, or this grinding in the colloid mill or attrition mill may be done after combination of the residue with the oil so that the residue will be included in the body of the oil which is to be infused.

If desired, this residue may be removed from the oil after the infusion has taken place by filtration or centrifuging although in some cases it has been found desirable to leave the olive flesh in the oil, particularly where it is desirable to give an unusual flavor or taste to a salad oil which then can be directly used for making a salad dressing.

It has also been found possible to utilize the residue in finely divided condition for admixture with water and alcohol particularly for the purpose of removing the bitter substances contained therein in the production of special "bitters" containing the bitter principles of the olives and which can be extracted preferably by the use of combinations of water and alcohol such as by a combination of 80% water and 20% ethyl alcohol although other proportions of water and alcohol may be employed in the production of such "bitters."

Together with the salted dehydrated olives utilized in accordance with the present invention it has been found particularly desirable to employ a relatively small proportion of a drupe material such as bitter almonds, and the drupe kernels including particularly apricot kernels, peach kernels, plum kernels, sweet and sour cherry kernels, apple seeds and nectarine kernels.

It has been found, for example, that where between 1% and 2% by weight of apricot kernels or other drupes are utilized in conjunction with the salted dehydrated olives of the present invention for combination at the time of expressing or for combination with the olives in the formation of a paste as above described, that the oil obtained from the paste as by expression in the manner indicated above produces a novel glyceride oil having unusual flavor and quality advantages that cannot be obtained even by the use of the salted dehydrated olives alone.

The oil that is obtained from the olive-apricot kernel or olive-drupe combination may be utilized by itself or in combination with other glyceride oils such as for combination with ordinary olive oil, refined deodorized cottonseed oil, corn oil, peanut oil, sesame oil, soya bean oil, etc., to produce novel glyceride oils and which may be utilized as salad and cooking oils or in the preparation of novel mayonnaise, French dressing and other salad dressings as well as in the pharmaceutical industry.

The present application is a continuation in part of application, Serial No. 365,210 filed November 12, 1940, and through said application continues the subject matter of applications, Serial No. 320,637 filed June 30, 1939, now Patent 2,221,404, Serial No. 332,482 filed April 30, 1940, and Serial No. 418,843 filed November 12, 1941, and through said applications continues in part the subject matter of the applications which matured into Patents 2,199,364 and 2,192,866.

The present application is particularly directed to the production of the novel olive oil while the use of such olive oil for blending or for admixture with other oils is more fully described and claimed in copending application, Serial No. 418,843 filed November 12, 1941.

Having described my invention, what I claim is:

1. A process of producing a novel olive oil in highly stabilized condition and highly resistant to oxidative deterioration, which comprises curing olives thoroughly with common salt until the flesh of the olives has taken up a substantial amount of salt, and then expressing such salt cured olives to produce said oil.

2. A process of producing a novel olive oil in highly stabilized condition and highly resistant to oxidative deterioration, which comprises thoroughly salting and simultaneously dehydrating olives until the flesh of the olives has taken up a substantial amount of salt, grinding the salted and dehydrated olives, and then expressing such ground olives to produce said oil, said oil being highly resistant to oxidative deterioration.

3. A process of producing a novel olive oil in highly stabilized condition and highly resistant to oxidative deterioration, which comprises curing olives in a substantially concentrated brine until the flesh of the olives has taken up a substantial amount of salt, grinding the cured olives and then expressing such cured olives to produce said oil.

4. A process of producing a novel olive oil in highly stabilized condition and highly resistant to oxidative deterioration, which comprises curing ground olives thoroughly with common salt until the flesh of the olives has taken up a substantial amount of salt, and then expressing such ground salt cured olives to produce said oil.

5. A process of producing a novel olive oil in highly stabilized condition and highly resistant to oxidative deterioration, which comprises providing olives in ripe condition, thoroughly salting and simultaneously dehydrating said ripe olives until the olives are shriveled and until the flesh of the olives has taken up a substantial amount of salt, grinding the salted and dehydrated olives, and then expressing such ground olives to produce said oil, said oil being highly resistant to oxidative deterioration.

6. A process of producing a novel olive oil in highly stabilized condition and highly resistant to oxidative deterioration, which comprises providing olives in ripe condition, thoroughly salting and simultaneously dehydrating said ripe olives until the olives are shriveled and until the flesh of the olives has taken up at least 5% of salt, grinding the salted and dehydrated olives, and then expressing such ground olives to produce said oil, said oil being highly resistant to oxidative deterioration, said oil being capable when added in a small amount to an oil selected from the group consisting of the glyceride oils and refined white petrolatum oil of developing highly desirable stability, olive flavor and odor.

7. A process of producing a novel glyceride oil in highly stabilized condition and highly resistant to oxidative deterioration, which comprises curing olives with common salt until the flesh of the olives has taken up a substantial amount of salt, grinding the salt cured olives, combining said salt cured ground olives with a relatively small proportion of a ground drupe, and then expressing such ground combination of the salt cured olives and the drupe to produce said oil.

8. A process of producing a novel glyceride oil in highly stabilized condition and highly resistant to oxidative deterioration, which comprises curing olives with common salt until the flesh of the olives has taken up a substantial amount of salt, grinding the salt cured olives, combining said salt cured ground olives with a relatively small proportion of bitter almonds, and then expressing such ground combination of the salt cured olives and the bitter almonds to produce said oil.

9. A process of producing a novel olive oil in highly stabilized condition and highly resistant to oxidative deterioration, which comprises providing olives in ripe, black condition, thoroughly salting and simultaneously dehydrating said ripe olives until the olives are shriveled and until the flesh of the olives has taken up a substantial amount of salt, grinding the salted and dehydrated olives, and then expressing such ground olives to produce said oil, said oil being highly resistant to oxidative deterioration.

10. A process of producing a novel olive oil in highly stabilized condition and highly resistant to oxidative deterioration, which comprises providing olives in ripe, black condition, thoroughly salting and simultaneously dehydrating said ripe olives until the olives are shriveled and until the flesh of the olives has taken up at least 5% of salt, grinding the salted and dehydrated olives, and then expressing such ground olives to produce said oil, said oil being highly resistant to oxidative deterioration, said oil being capable when added in a small amount to an oil selected from the group consisting of the glyceride oils and refined white petrolatum oil of developing highly desirable stability, olive flavor and odor.

11. A process of producing a novel glyceride oil in highly stabilized condition and highly resistant to oxidative deterioration, which comprises thoroughly salting and simultaneously dehydrating olives until the flesh of the olives has taken up a stubstantial amount of salt, grinding the salted and dehydrated olives with a relatively small proportion of a drupe and then expressing such ground combination of olives and drupe to produce said oil, said oil being highly resistant to oxidative deterioration.

SIDNEY MUSHER.